US009661494B2

(12) United States Patent
Suzuki et al.

(10) Patent No.: US 9,661,494 B2
(45) Date of Patent: May 23, 2017

(54) CONTROL APPARATUS, CONTROL METHOD, COMMUNICATION SYSTEM AND PROGRAM

(71) Applicant: NTT DOCOMO, INC., Tokyo (JP)

(72) Inventors: Kazunari Suzuki, Tokyo (JP); Koutarou Nagase, Tokyo (JP); Nobuhiro Sawai, Tokyo (JP); Teppei Azuma, Tokyo (JP); Ryouhei Kurita, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/900,707

(22) PCT Filed: Jun. 25, 2014

(86) PCT No.: PCT/JP2014/066879
§ 371 (c)(1),
(2) Date: Dec. 22, 2015

(87) PCT Pub. No.: WO2014/208612
PCT Pub. Date: Dec. 31, 2014

(65) Prior Publication Data
US 2016/0135040 A1    May 12, 2016

(30) Foreign Application Priority Data

Jun. 28, 2013  (JP) .................................. 2013-136204

(51) Int. Cl.
*H04W 8/26* (2009.01)
*H04W 8/20* (2009.01)
*H04W 4/00* (2009.01)

(52) U.S. Cl.
CPC ............. *H04W 8/26* (2013.01); *H04W 8/205* (2013.01); *H04W 4/001* (2013.01)

(58) Field of Classification Search
CPC ........ H04W 8/26; H04W 8/205; H04W 4/001
See application file for complete search history.

(56) References Cited

U.S. PATENT DOCUMENTS

| 7,693,506 B1 * | 4/2010 | Back .................... H04W 60/00 455/432.1 |
| 9,313,650 B2 * | 4/2016 | Azuma ................. H04W 8/205 |

(Continued)

FOREIGN PATENT DOCUMENTS

| JP | 2013505658 A | 2/2013 |
| WO | 2011036484 A2 | 3/2011 |

OTHER PUBLICATIONS

Extended European Search Report issued in corresponding Japanese Application No. 14818053.2 dated Nov. 21, 2016, pp. 1-14.

(Continued)

*Primary Examiner* — Brandon Miller
(74) *Attorney, Agent, or Firm* — MKG, LLC

(57) ABSTRACT

A control apparatus includes: a determination unit that determines whether identification information for identifying a mobile communication terminal in a second mobile communication network can be changed from first identification information assigned in the first mobile communication network to a second identification information assigned in the second mobile communication network, when the mobile communication terminal in which the first identification information is stored is situated in a region in which the second mobile communication network can be used and the mobile communication terminal uses the first mobile communication network via a second mobile communication network; and a notification unit that transmits a notification of a change of the identification information to a request apparatus that is connected to the second mobile communication network and is configured to request the (Continued)

mobile communication terminal to change the identification information, if it is determined that the identification information can be changed.

8 Claims, 6 Drawing Sheets

(56) References Cited

U.S. PATENT DOCUMENTS

| | | | |
|---|---|---|---|
| 2010/0136967 A1* | 6/2010 | Du | H04W 8/205 |
| | | | 455/432.3 |
| 2010/0248690 A1 | 9/2010 | Biggs et al. | |
| 2012/0108204 A1 | 5/2012 | Shell et al. | |
| 2012/0282924 A1 | 11/2012 | Tagg et al. | |
| 2013/0095795 A1* | 4/2013 | Shi | H04L 61/20 |
| | | | 455/411 |
| 2014/0220968 A1* | 8/2014 | Stenberg | H04W 8/18 |
| | | | 455/433 |

OTHER PUBLICATIONS

PCT International Search Report issued in International Application No. PCT/JP2014/066879, date mailed Sep. 22, 2014, pp. 1-2.

\* cited by examiner

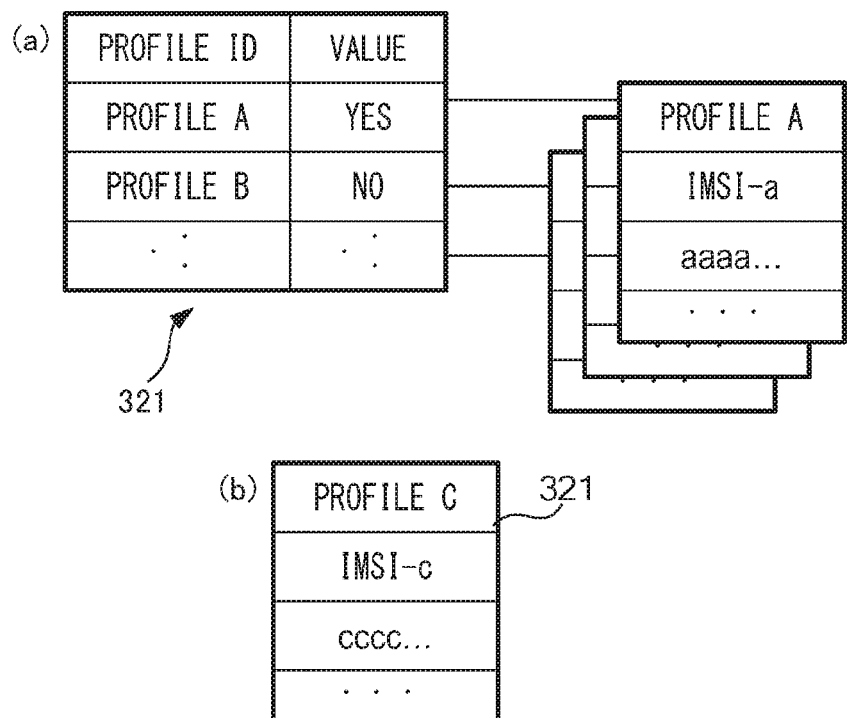
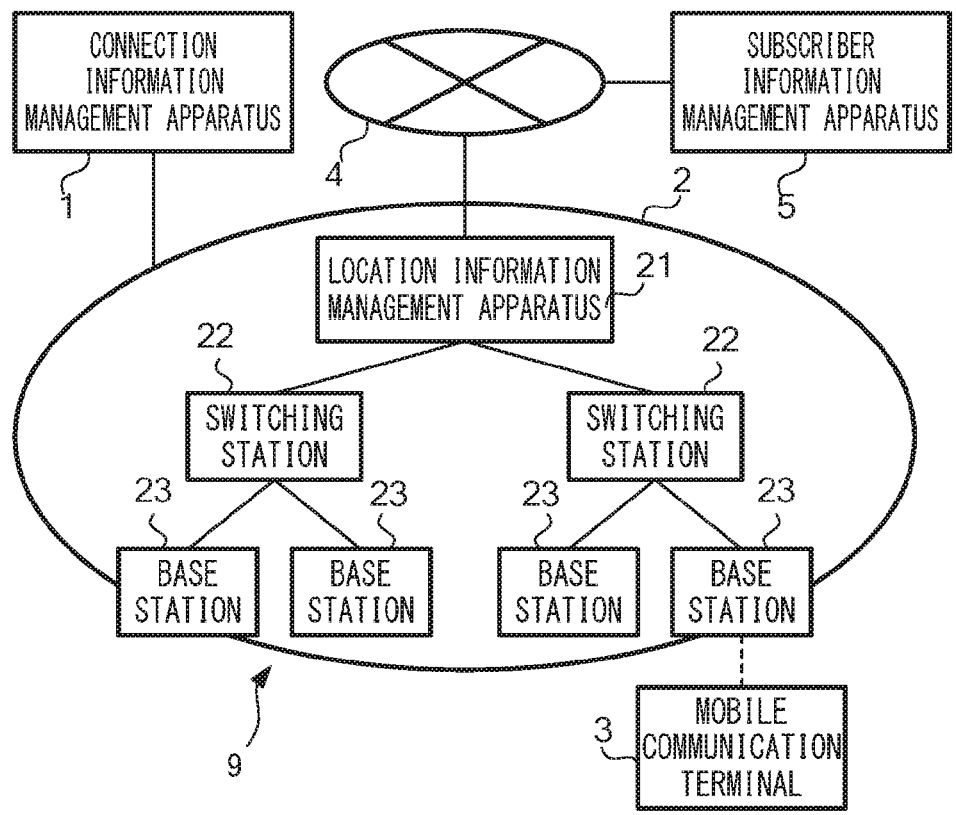
FIG. 5
FIG. 6

CONTROL APPARATUS, CONTROL METHOD, COMMUNICATION SYSTEM AND PROGRAM

TECHNICAL FIELD

The present invention relates to a technique for controlling mobile communication terminals that use the mobile communication network with use of identification information assigned in that mobile communication network.

BACKGROUND ART

Mobile communication terminals such as mobile phones can perform audio communication and data communication due to being provided with a module called a SIM (Subscriber Identity Module). An IMSI (International Mobile Subscriber Identity), which is a unique identification number assigned to the user of the mobile communication terminal by a carrier, is stored in this SIM. The IMSI includes an MCC (Mobile Country Code) that indicates the user's country, an MNC (Mobile Network Code) that indicates the carrier to which the user is subscribed, and an MSIN (Mobile Station Identification Number), which is a code for identifying the user. Since the IMSI includes information corresponding to the country and the carrier, one carrier can be used by each IMSI, and one country corresponds to each IMSI.

In recent years, the ETSI (European Telecommunications Standards Institute) has been examining a SIM standard that allows the IMSI to be changed via the mobile communication network. This type of SIM is called an eSIM (Embedded Subscriber Identity Module). With an eSIM, by changing the IMSI, a mobile communication terminal can directly use multiple carriers without relying on roaming.

With this type of mobile communication terminal that can receive communication services provided by multiple carriers, costs incurred due to roaming can be reduced by changing the IMSI according to the current location. For example, JP 2013-505658A discloses a management method in which subscriber network identification information is automatically provided to a subscribed communication device by a central network server. According to this management method, the central network server receives a notification regarding a change in the current location of the subscribed device, determines whether new subscriber network identification information is to be provided based on the notification, and, if it is determined that new information is to be provided, transmits subscriber network identification information selected based on the current location to the subscribed device. As a result, the mobile device operates using an appropriate IMSI and connects to a preferred network, thus making it possible for the mobile device user to avoid or reduce roaming charges.

Although the IMSI of an eSIM can be changed, multiple IMSIs cannot be used at the same time, and generally no distinction is made between an IMSI written to a SIM and an IMSI written to an eSIM. In other words, there are cases where an apparatus such as the server providing a communication service does not distinguish between a mobile communication terminal that can use an eSIM and a mobile communication terminal that cannot use an eSIM. Since the IMSI cannot be changed in a mobile communication terminal that cannot use an eSIM, it is useless to request the mobile communication terminal to change its IMSI. However, with the technique disclosed in Patent Document 1, when a customer enters a new country, an IMSI broker checks a subscribed user record and, if the SIM already has an appropriate IMSI in that country, attempts to update the subscriber's SIM by radio transmitting an appropriate IMSI update. In other words, the technique disclosed in JP 2013-505658A is based on the presumption that mobile communication terminals can use an eSIM, and does not envision the coexistence of this type of mobile communication terminal and mobile communication terminals that cannot use an eSIM.

Also, there are cases where a mobile communication terminal user desires to change the connected mobile communication network depending on the application program (hereinafter, referred to as "app") executed in the mobile communication terminal. However, it has not been possible to realize this with the techniques described in prior JP 2013-505658A and the like.

SUMMARY

An object of the present invention is to send a request for changing identification information of a mobile communication to the mobile communication terminal that is capable of changing the identification information.

A control apparatus according to the present invention includes: a determination unit that determines whether identification information for identifying a mobile communication terminal in a second mobile communication network can be changed from first identification information assigned in the first mobile communication network to a second identification information assigned in the second mobile communication network, when the mobile communication terminal in which the first identification information is stored is situated in a region in which the second mobile communication network can be used and the mobile communication terminal uses the first mobile communication network via a second mobile communication network; and a notification unit that transmits a notification of a change of the identification information to a request apparatus that is connected to the second mobile communication network and is configured to request the mobile communication terminal to change the identification information, if it is determined that the identification information can be changed.

It is preferable that the control apparatus includes an inquiry unit that transmits an inquiry regarding whether the identification information can be changed to a management apparatus, wherein the determination unit determines whether the identification information can be changed based on a result of the inquiry.

Also, it is preferable that the control apparatus includes a specification unit that specifies an application program used by the mobile communication terminal based on communication performed with the mobile communication terminal, wherein the management apparatus manages information indicating whether the identification information can be changed in association with application programs, and the inquiry unit transmits an inquiry regarding the information associated with the application program specified by the specification unit to the management apparatus.

Also, it is preferable that the mobile communication terminal changes the identification information from the first identification information to the second identification information upon receipt of a request for changing the identification information from the request apparatus.

Also, a communication system according to the present invention includes: a control apparatus that controls a mobile communication terminal that uses a mobile communication network with use of identification information assigned in the mobile communication network; and a request apparatus connected to the mobile communication network, that requests the mobile communication terminal to change the identification information upon receipt of a notification of a change of the identification information by the control apparatus, wherein the control apparatus includes: a determination unit that determines whether identification information for identifying a mobile communication terminal in a second mobile communication network can be changed from first identification information assigned in the first mobile communication network to a second identification information assigned in the second mobile communication network, when the mobile communication terminal in which the first identification information is stored is situated in a region in which the second mobile communication network can be used and the mobile communication terminal uses the first mobile communication network via a second mobile communication network, and a notification unit that transmits a notification of a change of the identification information to a request apparatus that is connected to the second mobile communication network and is configured to request the mobile communication terminal to change the identification information, if it is determined that the identification information can be changed.

It is preferable that the communication system includes a management apparatus that replies that the identification information can be changed from the first identification information to the second identification information if a time when an inquiry regarding whether the identification information can be changed is received from the control apparatus, a location of the mobile communication terminal at that time, or a change in price or functionality in a case where the mobile communication terminal changes the identification information from the first identification information to the second identification information satisfies a predetermined condition, wherein the determination unit determines whether the identification information can be changed based on a reply received from the management apparatus.

Also, a control method according to the present invention includes: determining whether identification information for identifying a mobile communication terminal in a second mobile communication network can be changed from first identification information assigned in the first mobile communication network to a second identification information assigned in the second mobile communication network, when the mobile communication terminal in which the first identification information is stored is situated in a region in which the second mobile communication network can be used and the mobile communication terminal uses the first mobile communication network via a second mobile communication network; and transmitting a notification of a change of the identification information to a request apparatus that is connected to the second mobile communication network and is configured to request the mobile communication terminal to change the identification information, if it is determined that the identification information can be changed.

Also, a program according to the present invention causes a computer to execute: determining whether identification information for identifying a mobile communication terminal in a second mobile communication network can be changed from first identification information assigned in the first mobile communication network to a second identification information assigned in the second mobile communication network, when the mobile communication terminal in which the first identification information is stored is situated in a region in which the second mobile communication network can be used and the mobile communication terminal uses the first mobile communication network via a second mobile communication network; and transmitting a notification of a change of the identification information to a request apparatus that is connected to the second mobile communication network and is configured to request the mobile communication terminal to change the identification information, if it is determined that the identification information can be changed.

According to the present invention, it is possible to send a request for changing identification information to a mobile communication terminal that is capable of changing identification information for identifying the mobile communication terminal.

BRIEF DESCRIPTION OF THE DRAWINGS

FIG. 5 is a diagram showing an example of a profile storage region.

FIG. 6 is a diagram showing an example of a configuration of a mobile communication network.

DETAILED DESCRIPTION

1. Embodiment 1-1. Configuration of Communication System

Figure 1:
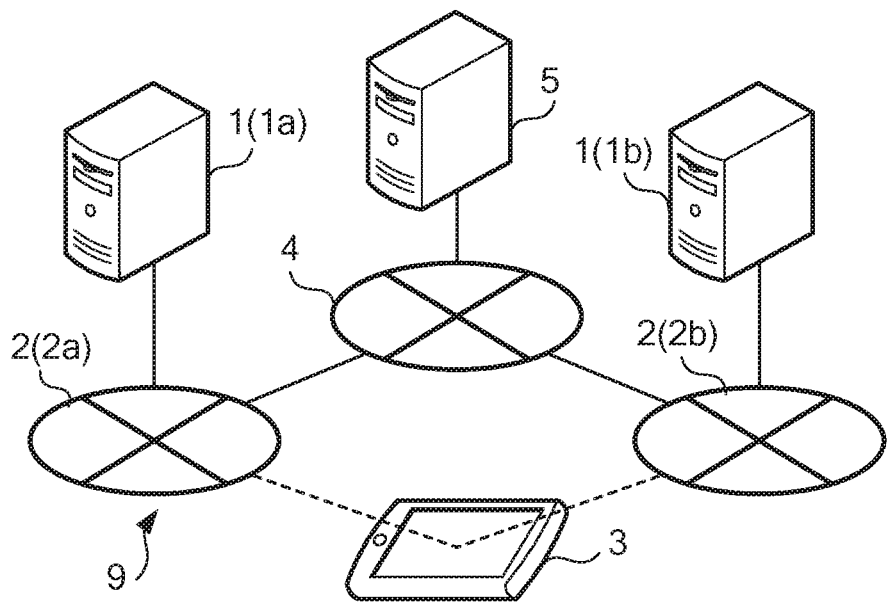
FIG. 1 is a diagram showing an overall configuration of a communication system.

FIG. 1 is a diagram showing the overall configuration of communication system 9. Communication system 9 has connection information management apparatuses 1a and 1b (hereinafter, collectively referred to as "connection information management apparatuses 1" when there is no particular need for distinction), mobile communication networks 2a and 2b (hereinafter, collectively referred to as "mobile communication networks 2" when there is no particular need for distinction), mobile communication terminal 3, communication line 4, and subscriber information management apparatus 5.

Mobile communication networks 2a and 2b are mobile communication networks of mutually different carriers. Mobile communication networks 2 each provide a communication service to mobile communication terminal 3. Note that although there are two mobile communication networks 2 in this example, there may be three or more.

Mobile communication terminal 3 is a terminal device that receives wireless communication services from mobile communication networks 2, examples of which include a mobile phone such as a smartphone. Mobile communication terminal 3 has a display unit such as a liquid crystal display unit for notifying information to a user. Mobile communication terminal 3 uses an IMSI as identification information for identifying mobile communication terminal 3 when using mobile communication networks 2. The IMSI is stored in an SIM or an eSIM of mobile communication terminal 3.

Communication line 4 is a line for connecting mobile communication networks 2 to subscriber information management apparatus 5, examples of which include the Internet and a regional IP network.

Connection information management apparatuses 1a and 1b are apparatuses that manage information indicating the respective states of connection of mobile communication terminal 3 to mobile communication networks 2a and 2b (connection information), and connect to corresponding mobile communication networks 2 and transmit connection information to mobile communication terminal 3 via mobile communication networks 2. Connection information management apparatuses 1 perform so-called "push transmission" of connection information and the like using SMS (short message service) or the like. Connection information management apparatuses 1 may have a configuration corresponding to an SM (subscription manager) in the eSIM standard. Note that if a predetermined notification is received from mobile communication networks 2, connection information management apparatuses 1 transmit, to mobile communication terminal 3, an instruction requesting a profile change as connection information.

Subscriber information management apparatus 5 is an apparatus that manages information regarding subscriber contracts, for example. Subscriber information management apparatus 5 manages information on subscribers including not only users who receive a communication service from mobile communication network 2 of one carrier, but also users who receive communication services from mobile communication networks 2 of multiple carriers.

1-2. Configuration of Subscriber Information Management Apparatus

Figure 2:
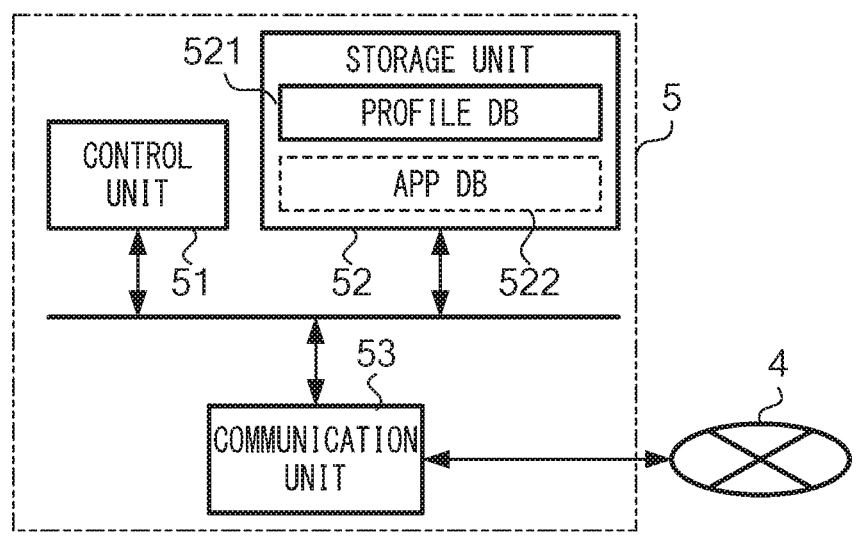
FIG. 2 is a diagram showing an example of a configuration of a subscriber information management apparatus.

FIG. 2 is a diagram showing an example of the configuration of subscriber information management apparatus 5. Subscriber information management apparatus 5 has control unit 51, storage unit 52, and communication unit 53.

Control unit 51 is configured to control operations of the units of subscriber information management apparatus 5. Control unit 51 includes an arithmetic processing unit such as a CPU (Central Processing Unit) and storage apparatuses such as a ROM (Read Only Memory) and a RAM (Random Access Memory), and executes programs stored in these storage apparatuses.

Communication unit 53 is an interface for performing communication with mobile communication terminal 3 and the like via communication line 4.

Storage unit 52 is a high-volume storage such as a hard disk or a flash memory, and stores programs that are read by control unit 51. Note that storage unit 52 may include a so-called removable disk, that is to say, a removable recording medium. Also, storage unit 52 stores profile database 521 (hereinafter, the database is indicated as "DB" in the figures).

Figure 3:
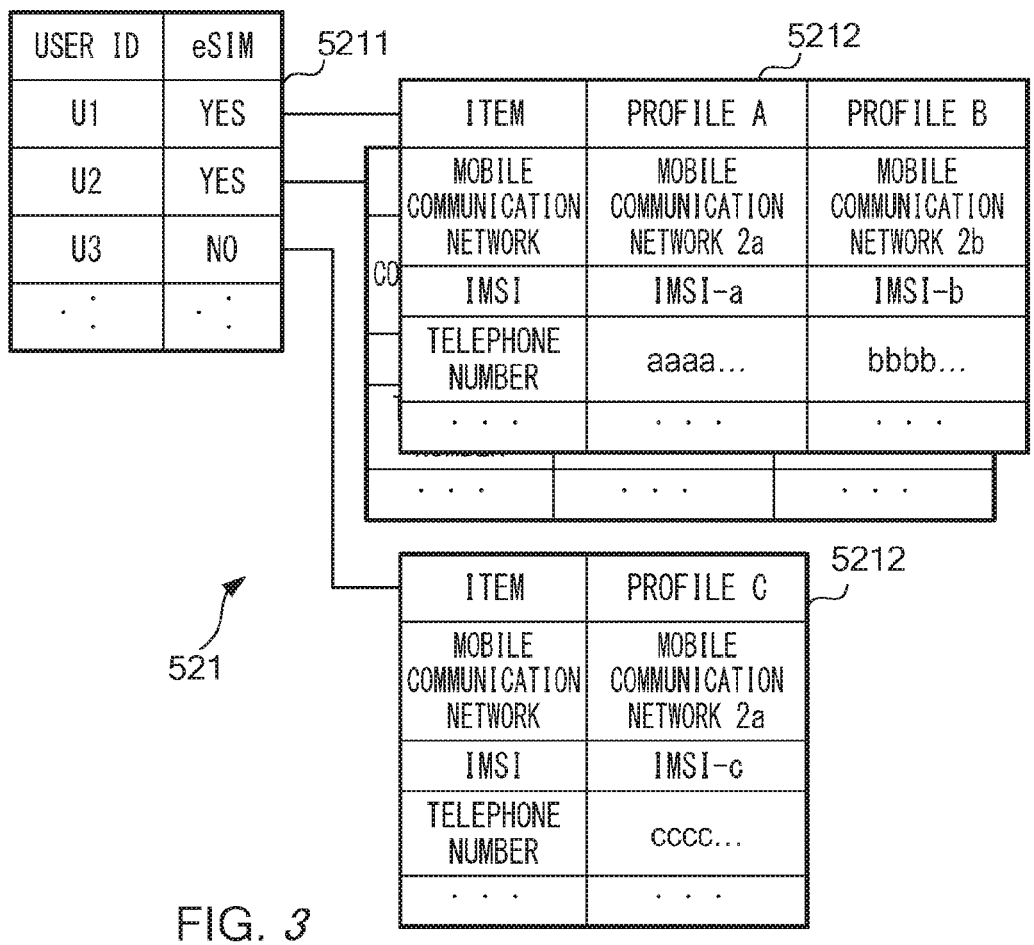
FIG. 3 is a diagram showing an example of a profile database.

FIG. 3 is a diagram showing an example of profile database 521. Profile database 521 has association table 5211 in which the user ID of each user is associated with information indicating whether mobile communication terminal 3 used by that user is a mobile communication terminal that can use an eSIM (the "eSIM" field in FIG. 3).

For example, according to association table 5211 shown in FIG. 3, mobile communication terminal 3 in the possession of the user with user ID "U1" is associated with "YES" as the value of the "eSIM" field, and therefore is a mobile communication terminal that can use an eSIM. On the other hand, in this association table 5211, mobile communication terminal 3 in the possession of the user with user ID "U3" is associated with "NO" as the value of the "eSIM" field, and therefore is a mobile communication terminal that cannot use an eSIM.

Also, in profile database 521, each user ID is associated with profile table 5212 storing the profiles assigned in mobile communication networks 2 of the carriers to which the user is subscribed. The profile is information necessary for receiving a communication service from the carrier, such as an IMSI, a phone number, and the like.

For example, in the case of profile database 521 shown in FIG. 3, mobile communication terminal 3 in the possession of the user with user ID "U1" is associated with two profiles. Out of these profiles, "Profile A" is the profile assigned in mobile communication network 2a, and "Profile B" is the profile assigned in mobile communication network 2b. On the other hand, mobile communication terminal 3 in the possession of the user with user ID "U3" is associated with the one profile "Profile C" that has been assigned in mobile communication network 2a. Mobile communication terminal 3 in the possession of the user with user ID "U3" is a mobile communication terminal that cannot use an eSIM, and therefore "Profile C" written to the SIM cannot be changed.

Subscriber information management apparatus 5 having the above configuration replies to inquiries from mobile communication networks 2. Specifically, if an inquiry is received regarding whether the profile by which mobile communication terminal 3 is identified can be changed to a profile assigned in a mobile communication network 2 in the range of mobile communication terminal 3, subscriber information management apparatus 5 checks whether the profile can be changed, and sends a reply.

Specifically, upon receiving the above-described inquiry along with the IMSI, which is the identification information, of mobile communication terminal 3, control unit 51 of subscriber information management apparatus 5 searches for the IMSI in profile database 521. Control unit 51 specifies profile table 5212 in which the IMSI is described, specifies the user ID associated with the specified profile table 5212, and specifies the value of the "eSIM" field associated with the user ID in association table 5211 included in profile database 521. If the specified value of the "eSIM" field is "YES", control unit 51 replies to mobile communication network 2 to the effect that the above-described change can be made, and if the value is "NO", replies to the effect that the above-described change cannot be made.

1-3. Configuration of Mobile Communication Terminal

Figure 4:
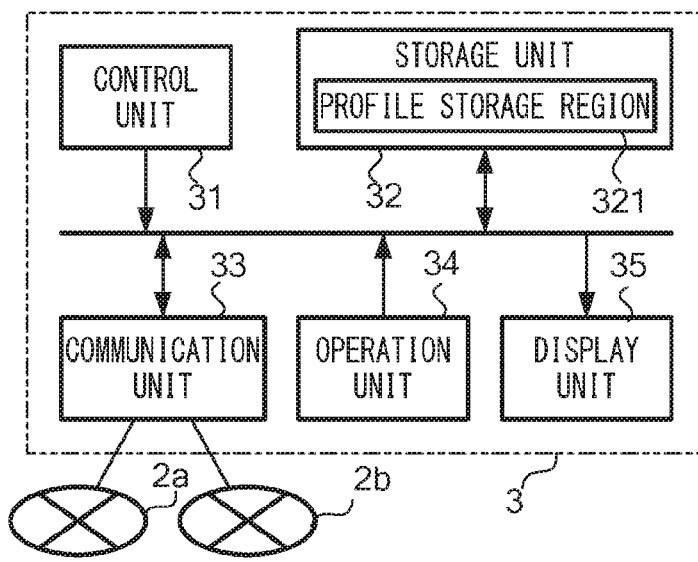
FIG. 4 is a diagram showing an example of a configuration of a mobile communication terminal.

FIG. 4 is a diagram showing an example of the configuration of mobile communication terminal 3. Mobile communication terminal 3 has control unit 31, storage unit 32, communication unit 33, operation unit 34, and display unit 35.

Control unit 31 is configured to control operations of the units of mobile communication terminal 3. Control unit 31 includes an arithmetic processing unit such as a CPU and storage apparatuses such as a ROM and a RAM, and executes programs stored in these storage apparatuses.

Communication unit 33 is an interface for performing communication with connection information management apparatuses 1 and subscriber information management apparatus 5 via mobile communication networks 2.

Operation unit 34 includes operation buttons, a coordinate acquisition unit, and the like for the input of various types of instructions, receives operations made by a user, and supplies signals corresponding to the operation content to control unit 31.

Display unit 35 is a display apparatus that employs liquid crystal or the like, and displays images in accordance with instructions from control unit 31.

Storage unit 32 is a high-volume storage such as a hard disk or a flash memory, and stores programs that are read by control unit 31. Note that storage unit 32 may include a so-called removable disk, that is to say, a removable recording medium. Storage unit 32 includes the above-described eSIM if mobile communication terminal 3 can use an eSIM, and includes the above-described SIM if mobile communication terminal 3 cannot use an eSIM. The eSIM or SIM functions as profile storage region 321. Note that the eSIM or SIM may be a module that is physically mounted to mobile communication terminal 3, or may be a built-in module.

If mobile communication terminal 3 can use an eSIM, mobile communication terminal 3 can perform communication using the identification information assigned in any of mobile communication networks 2 by changing the identification information such as the IMSI stored in the eSIM. The IMSI may be changed in accordance with a user operation, or may be changed in accordance with an instruction received from an external server apparatus via mobile communication network 2 in use. Also, the eSIM may store multiple IMSIs and select one of the IMSIs, or may download (acquire) an IMSI from an external server apparatus if the IMSI to be used is not stored.

FIG. 5 is a diagram showing an example of profile storage region 321. If mobile communication terminal 3 can use an eSIM, as shown in FIG. 5(a), a profile ID, which is identification information for identifying the profile, flag, and profile content are associated with each other in profile storage region 321. The flag is information indicating whether the profile identified by the corresponding profile ID can be used. The flag is described such that only one profile is usable out of the profiles stored in profile storage region 321. In the example shown in FIG. 5(a), "YES" is written in the profile with the profile ID "Profile A", that means the Profile A is usable. Note that the IMSI included in the profile may be used as the profile ID.

On the other hand, if mobile communication terminal 3 cannot use an eSIM, as shown in FIG. 5(b), a profile ID, which is identification information for identifying the profile, and profile content are associated with each other in profile storage region 321. In this case, mobile communication terminal 3 is configured such that the profile is stored in the SIM, and the IMSI stored in the SIM cannot be changed by a user operation or an instruction from an external server apparatus. For example, in the example shown in FIG. 5(b), the profile with the profile ID "Profile C" is stored in profile storage region 321.

1-4. Configuration of Mobile Communication Network

FIG. 6 is a diagram showing an example of the configuration of mobile communication network 2. Mobile communication network 2 has location information management apparatus 21, switching stations 22, and base stations 23. Location information management apparatus 21 is a server apparatus that manages, as subscribers, users of mobile communication terminals 3 that connect to mobile communication network 2 to which location information management apparatus 21 belongs. Location information management apparatus 21 manages in-range information indicating the communication ranges in which mobile communication terminals 3 are located, such as an HLR (Home Location Register) and a VLR (Visitor Location Register).

Each switching station 22 is an apparatus that performs access management, location registration, and the like for mobile communication terminals 3 that are in the range of mobile communication network 2, and is an SGSN (Serving GPRS Support Node) for example. Switching station 22 receives location registration signals from mobile communication terminals 3 that accessed base station 23 under its control, and transfers the location registration signals to location information management apparatus 21. Location information management apparatus 21 performs authentication processing and the like on the location registration signals, and then performs location registration for mobile communication terminals 3 based on the location registration signals. Note that switching station 22 may have multiple base stations 23 under its control.

Each base station 23 is a terminal communication apparatus directly accessed by mobile communication terminals 3. Base station 23 periodically transmits an area signal by which a mobile communication terminal identifies the communication range assigned to mobile communication terminal 3, for example. Upon receiving the area signal, mobile communication terminal 3 transmits a location registration signal that includes the area signal and its IMSI as identification information for identifying mobile communication terminal 3. When base station 23 receives the location registration signal from mobile communication terminal 3, base station 23 transmits the location registration signal to switching station 22.

1-5. Configuration of Switching Station

Figure 7:
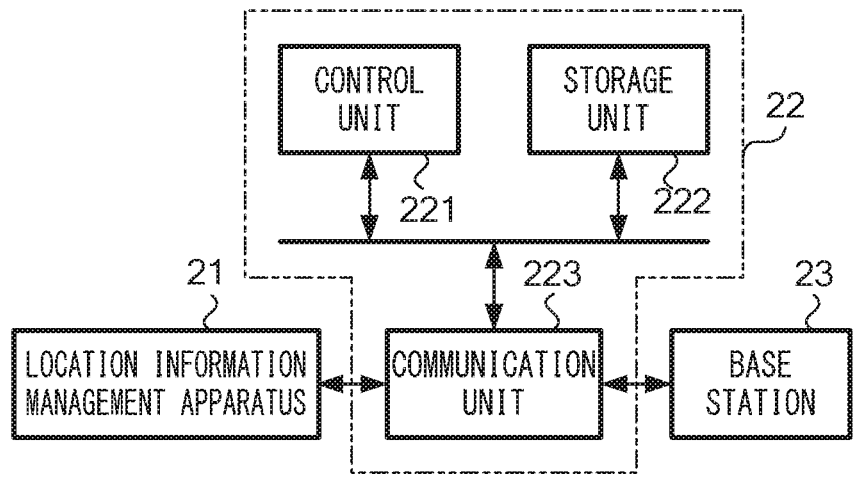
FIG. 7 is a diagram showing an example of a configuration of a switching station.

FIG. 7 is a diagram showing an example of the configuration of switching station 22. Switching station 22 has control unit 221, storage unit 222, and communication unit 223.

Control unit 221 is configured to control operations of the units of switching station 22. Control unit 221 includes an arithmetic processing unit such as a CPU and storage apparatuses such as a ROM and a RAM, and executes programs stored in these storage apparatuses.

Communication unit 223 is an interface for performing communication with location information management apparatus 21 and base station 23.

Storage unit 222 is a high-volume storage such as a hard disk or a flash memory, and stores programs that are to be read by control unit 221. Note that storage unit 222 may include a so-called removable disk, that is to say, a removable recording medium.

1-6. Functional Configuration of Switching Station

Figure 8:
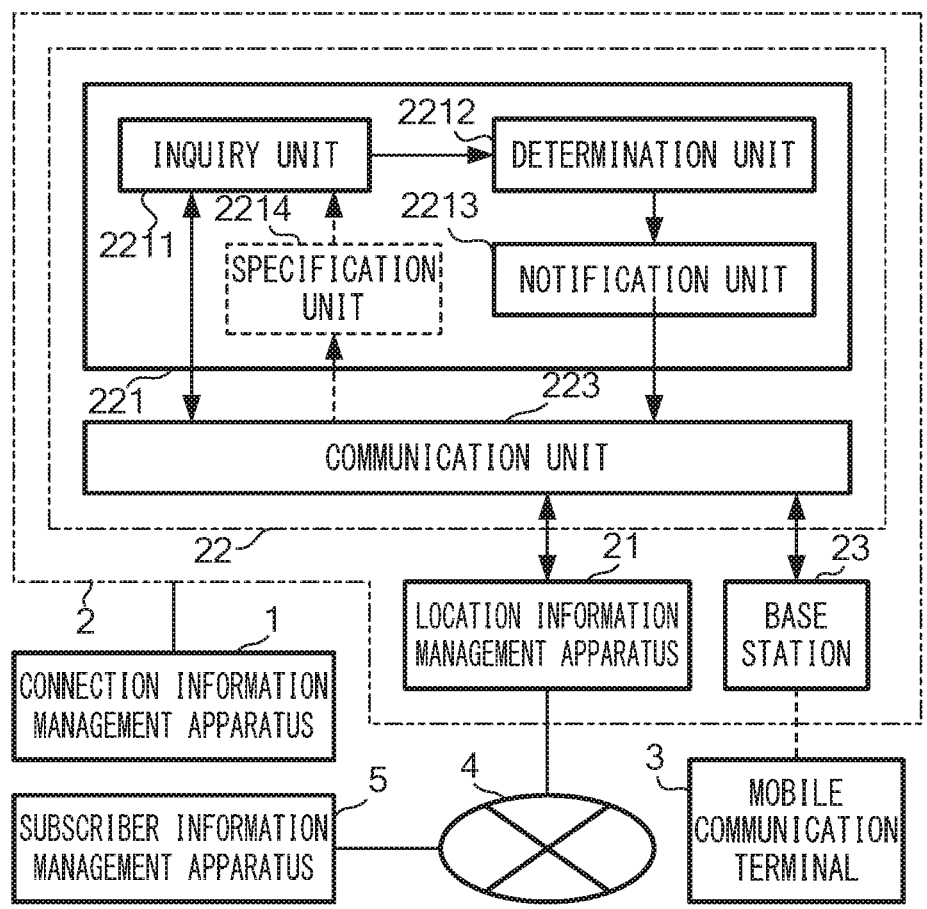
FIG. 8 is a diagram showing a functional configuration of the switching station.

FIG. 8 is a diagram showing the functional configuration of switching station 22. Control unit 221 of switching station 22 functions as inquiry unit 2211, determination unit 2212, and notification unit 2213.

When mobile communication terminal 3 transmits a communication request signal, which is a signal that includes the IMSI that identifies mobile communication terminal 3 and is for requesting communication with another communication device, base station 23 receives the communication request signal and transmits the communication request signal to switching station 22 that controls it. Control unit 221 of switching station 22 receives this communication request signal via communication unit 223, and determines whether the IMSI included in the communication request signal has been assigned in mobile communication network 2 to which it (switching station 22) belongs.

In the case of determining that the IMSI included in the communication request signal has been assigned in mobile communication network 2 to which it belongs, control unit 221 specifies identification information indicating the communication partner, which is included in the communication request signal, makes an inquiry to location information management apparatus 21, and establishes a communication path.

On the other hand, in the case of determining that the IMSI has not been assigned in mobile communication network 2 to which it belongs, control unit 221 functions as inquiry unit 2211. In this case, inquiry unit 2211 makes an inquiry to subscriber information management apparatus 5 (management apparatus) regarding whether the profile by which mobile communication terminal 3 identifies mobile communication terminal 3 can be changed from the profile currently being used (hereinafter, referred to as the first identification information) to a profile that includes the aforementioned IMSI assigned in mobile communication network 2 (hereinafter, referred to as the second identification information).

Determination unit 2212 determines whether mobile communication terminal 3 can change its profile, in accordance with information received as a reply from subscriber information management apparatus 5 in response to the inquiry made by inquiry unit 2211.

If determination unit 2212 determined that mobile communication terminal 3 can change its profile, notification unit 2213 sends, via communication unit 223, a notification to connection information management apparatus 1 to the effect that a profile change is to be made.

Connection information management apparatus 1 receives this notification and performs push transmission, to mobile communication terminal 3, of information for performing a profile change in accordance with the request. Mobile communication terminal 3 receives this information and makes a profile change in accordance with the notification from switching station 22. Note that if it is determined that mobile communication terminal 3 can change its identification information (profile) from the first identification information to the second identification information, connection information management apparatus 1 functions as a request apparatus that is connected to the second mobile communication network and that requests mobile communication terminal 3 to make an identification information change.

Accordingly, switching station 22 functions as a control apparatus that controls mobile communication terminal 3 to use a mobile communication network 2 with use of a profile assigned in that mobile communication network 2.

1-7. Operations in Communication System

Figure 9:
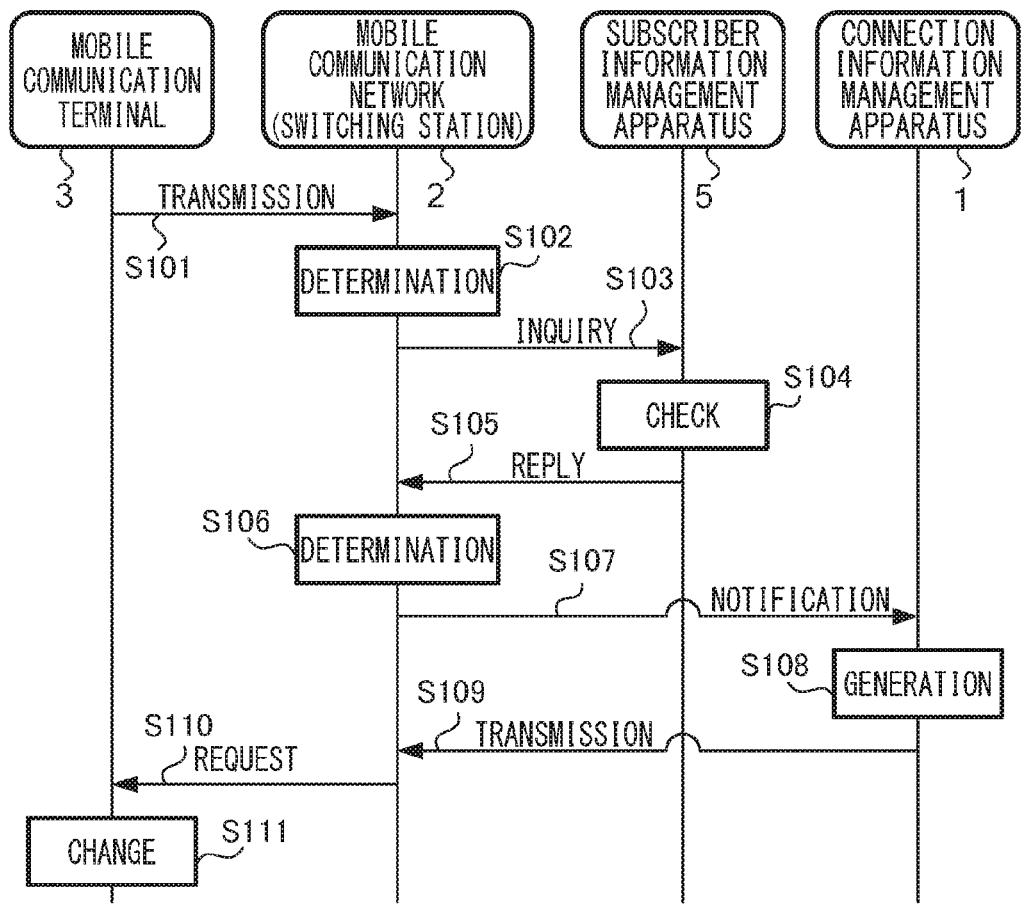
FIG. 9 is a sequence diagram showing a flow of operations in a communication system according to an embodiment.

FIG. 9 is a sequence diagram showing a flow of operations in communication system 9 according to this embodiment. When a communication request signal is transmitted from mobile communication terminal 3 to mobile communication network 2 (step S101), switching station 22 in mobile communication network 2 that received the communication request signal determines whether the IMSI included in the communication request signal has been assigned in mobile communication network 2 to which switching station 22 belongs (step S102). In the case of determining that the IMSI has not been assigned in mobile communication network 2 to which the switching station belongs, an inquiry is made to subscriber information management apparatus 5 regarding whether mobile communication terminal 3 can change the profile for identifying mobile communication terminal 3 (step S103).

Subscriber information management apparatus 5 receives the inquiry and checks whether mobile communication terminal 3 can change its profile (step S104). Specifically, subscriber information management apparatus 5 searches profile database 521 of storage unit 52 for the IMSI of mobile communication terminal 3, specifies the user ID associated with profile table 5212 that includes the IMSI, and specifies the value of the "eSIM" field associated with the user ID in association table 5211. Subscriber information management apparatus 5 replies to mobile communication network 2 to the effect that the above-described change can be made if the value of the specified "eSIM" field is "YES", and to the effect that the above-described change cannot be made if the value is "NO" (step S105).

Switching station 22 receives the reply from subscriber information management apparatus 5, and determines whether mobile communication terminal 3 can change its profile (step S106). In the case of determining that mobile communication terminal 3 can change its profile, switching station 22 sends a notification to connection information management apparatus 1 to the effect that a profile change is to be made (step S107). Connection information management apparatus 1 receives the notification and, in accordance with the notification, generates information for causing mobile communication terminal 3 to make a profile change (step S108). This information may include the new profile that is to be changed to, or may be a change instruction if mobile communication terminal 3 has already stored the new profile in profile storage region 321. Connection information management apparatus 1 may request the new profile from subscriber information management apparatus 5.

Connection information management apparatus 1 then transmits the generated information to mobile communication terminal 3 via mobile communication network 2 (steps S109 and S110), thus requesting mobile communication terminal 3 to make a profile change. Mobile communication terminal 3 receives information for making a profile change from switching station 22, and changes the profile for identifying mobile communication terminal 3 by writing the new profile to profile storage region 321 in accordance with the information and changing the flag associated with the new profile (step S111).

According to the above configuration, if a communication request signal is received, via an in-range mobile communication network 2, from mobile communication terminal 3 that is using an out-of-range mobile communication network 2, switching station 22 of communication system 9 checks whether mobile communication terminal 3 can change the identification information for identifying mobile communication terminal 3 to identification information that has been assigned in the in-range mobile communication network 2. Switching station 22 transmits a notification for changing the identification information only if mobile communication terminal 3 can change the identification information, and thus connection information management apparatus 1 can suppress useless requests.

2. Variations

Although an embodiment has been described above, the content of this embodiment can be modified as described below. Also, the following variations may be combined.

2-1. Variation 1

In the above-described embodiment, control unit 221 of switching station 22 functions as inquiry unit 2211 that makes an inquiry to subscriber information management apparatus 5 regarding whether the profile by which mobile communication terminal 3 is identified can be changed from the profile currently being used to a profile assigned in the above-described mobile communication network 2, and also functions as determination unit 2212 that makes a determination in accordance with the reply, but control unit 221 does not need to function as inquiry unit 2211. For example, if information indicating whether the identification information by which the mobile communication terminal 3 identifies is identified can be changed to identification information that has been assigned in the in-range mobile communication network 2 is stored in an apparatus other than subscriber information management apparatus 5, control unit 221 functions as determination unit 2212 by directly referencing that information.

For example, if subscriber information management apparatus 5 periodically distributes copies of association table 5211 in profile database 521 to connection information management apparatus 1, location information management apparatus 21, switching station 22, and the like, control unit 221 of switching station 22 can, by referencing the distributed copy, directly determine whether mobile communication terminal 3 can change its identification information without referencing subscriber information management apparatus 5.

2-2. Variation 2

In the above-described embodiment, profile database 521 that subscriber information management apparatus 5 stores in storage unit 52 includes association table 5211 in which the user ID of each user is associated with information indicating whether mobile communication terminal 3 of that user is a mobile communication terminal that can use an eSIM, but the information indicating whether mobile communication terminal 3 can change its identification information is not limited to association table 5211. Control unit 221 of switching station 22 may determine that mobile communication terminal 3 can change its identification information if another condition is satisfied instead of, or in addition to, mobile communication terminal 3 being able to use an eSIM.

For example, the user may set a time range or region in which the mobile communication terminal 3 can change its identification information, and cause this information to be stored in storage unit 52 of subscriber information management apparatus 5. In this case, for example, control unit 51 of subscriber information management apparatus 5 uses a clock or GPS (Global Positioning System) or the like to specify the time when an inquiry has been received from mobile communication network 2 or the location of mobile communication terminal 3 when the inquiry has been received, reference the above-described information stored in storage unit 52, and check whether the mobile communication terminal 3 can change its identification information at that time or location.

Also, control unit 51 of subscriber information management apparatus 5 may check whether mobile communication terminal 3 can change its identification information by comparing the price in the case where mobile communication terminal 3 continues to use the currently used profile (first identification information) with the price in the case of changing the profile to the profile that includes the IMSI that has been assigned in the in-range mobile communication network 2 (second identification information). For example, if the change in price in the case of changing from the first identification information to the second identification information satisfies a predetermined condition, control unit 51 of subscriber information management apparatus 5 may reply that the change can be made, in response to the above-described inquiry from mobile communication network 2. In this case, the predetermined condition is, for example, the condition that the change in the above-described price is a decrease by a predetermined price or more.

Also, control unit 51 of subscriber information management apparatus 5 may check whether the above-described change can be made based on a change in the functionality of mobile communication terminal 3 that would accompany the above-described change. For example, in accordance with whether the change in functionality in the case of changing from the first identification information to the second identification information satisfies a predetermined condition, control unit 51 of subscriber information management apparatus 5 may reply that the change can or cannot be made, in response to the above-described inquiry from mobile communication network 2.

In this case, the predetermined condition may be determined based on a function usage history of mobile communication terminal 3. For example, storage unit 52 of subscriber information management apparatus 5 may store functions available to the user when mobile communication terminal 3 is using the first identification information and functions available to the user when using the second identification information, along with the correspondence relationship between them. Also, storage unit 52 stores a history of the functions used by mobile communication terminal 3.

When an inquiry is received from switching station 22 of mobile communication network 2, control unit 51 of subscriber information management apparatus 5 references the history stored in storage unit 52 and specifies the change in the functionality of mobile communication terminal 3 that would accompany the above-described change. If a function that would no longer be available in the case where the identification information indicated by the eSIM of mobile communication terminal 3 is changed from the first identification information to the second identification information, is used by the user more often than a predetermined degree of frequency, control unit 51 may reply that the above-described change cannot be made, in response to the inquiry.

Specifically, subscriber information management apparatus 5 may reply that the identification information can be changed from the first identification information to the second identification information if the time when switching station 22 of mobile communication network 2 made the information inquiry, the location of the mobile communication terminal at that time, or the change in price or functionality in the case where mobile communication terminal 3 changes its identification information from the first identification information to the second identification information satisfies a predetermined condition.

Also, for example, subscriber information management apparatus 5 may manage information indicating whether mobile communication terminal 3 can change its profile for each app executed by mobile communication terminal 3.

Figure 10:
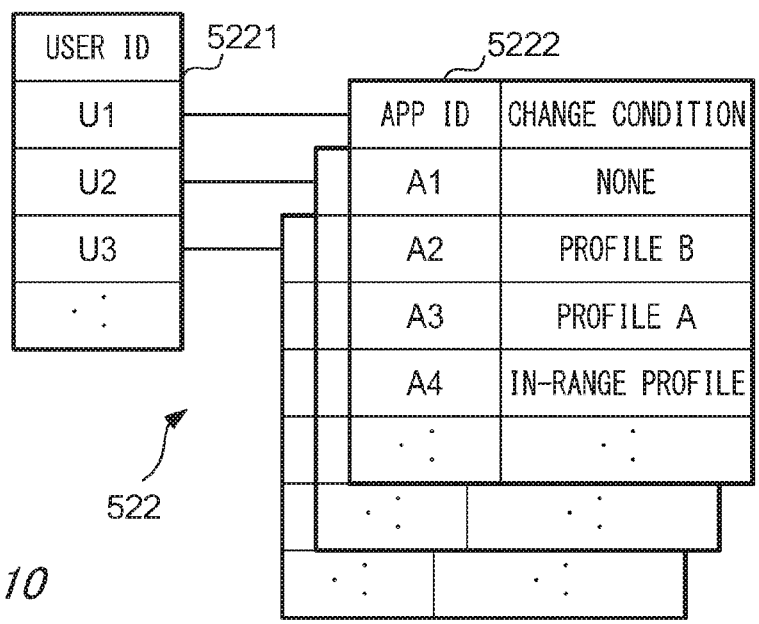
FIG. 10 is a diagram showing an example of an app database.

FIG. 10 is a diagram showing an example of app database 522 indicated by dashed lines in FIG. 2. In this variation, storage unit 52 of subscriber information management apparatus 5 stores app database 522. As shown in FIG. 10, app database 522 includes user ID list 5221 and respective app tables 5222 associated with the user IDs. In each app table 5222, identification information for apps (hereinafter, referred to as app IDs) executed in mobile communication terminal 3 by the user indicated by the corresponding user ID are described in correspondence with conditions related to a profile change made when the apps are executed by mobile communication terminal 3 (hereinafter, referred to as change conditions).

For example, if the app with app ID "A1" is executed in mobile communication terminal 3 in the possession of the user with user ID "U1", the corresponding change condition is "none", and therefore a profile change is not made. On the other hand, if the user with user ID "U1" executes the app with app ID "A2" in mobile communication terminal 3, the corresponding change condition is "Profile B". In this case, mobile communication terminal 3 writes Profile B in profile storage region 321 as a new profile, and changes a value of the flag associated with Profile B to "YES".

Also, the change condition may be determined such that the profile is changed to a profile that corresponds to in-range information managed by location information management apparatus 21. For example, as shown in FIG. 10, if the user with user ID "U1" executes the app with app ID "A4" in mobile communication terminal 3, the corresponding change condition is "in-range profile". In this case, for example, control unit 31 of mobile communication terminal 3 acquires in-range information from location information management apparatus 21, and, if mobile communication terminal 3 is in the range of mobile communication network 2a, makes a change to Profile A assigned in mobile communication network 2a.

In this configuration, when mobile communication terminal 3 transmits a communication request signal for requesting communication with another communication device, control unit 221 of switching station 22 receives the communication request signal and specifies the app ID of the app executed by mobile communication terminal 3 based on the communication request signal. Specifically, control unit 221 functions as specification unit 2214 indicated by dashed lines in FIG. 8, which specifies the app being used by mobile communication terminal 3 based on the content of communication performed with the mobile communication terminal.

Control unit 221 then determines whether the IMSI included in the communication request signal has been assigned in mobile communication network 2 to which the switching station belongs, and, if it is determined that the IMSI has not been assigned in mobile communication network 2 to which the switching station belongs, transmits the specified app ID to subscriber information management apparatus 5 and makes an inquiry to subscriber information management apparatus 5 (management apparatus) regarding whether the profile by which mobile communication terminal 3 is identified can be changed. Subscriber information management apparatus 5 receives the inquiry and checks whether mobile communication terminal 3 can change its profile.

Specifically, subscriber information management apparatus 5 searches profile database 521 of storage unit 52 for the IMSI of mobile communication terminal 3, specifies the user ID associated with profile table 5212 that includes the IMSI, and specifies the value of the "eSIM" field associated with the user ID in association table 5211. If the specified value of the "eSIM" field is "YES", subscriber information management apparatus 5 references app database 522 of storage unit 52, specifies the change condition that corresponds to the combination of the user ID and the app ID transmitted from the switching station 22, and sends, to switching station 22, a reply indicating that the change indicated by the change condition can be made.

According to this configuration, a profile change condition can be determined in advance for each app executed in mobile communication terminal 3. For example, assume that there is a carrier set such that the cost is lower when using UDP (User Datagram Protocol) compared to TCP (Transmission Control Protocol) as the communication protocol. In this case, if the change condition is determined such that a change is made to the profile assigned in mobile communication network 2 provided by the above carrier when executing an app that often uses UDP, the user can lower the communication cost. In other words, by determining the change conditions, the user can use profiles that are suited to the type of service or communication protocol used by apps executed by mobile communication terminal 3, for example.

2-3. Variation 3

In the above-described embodiment, in the case of determining that mobile communication terminal 3 can change its profile, switching station 22 notifies connection information management apparatus 1 that a profile change is to be made, but this notification may be made after receiving a user operation in mobile communication terminal 3.

Figure 11:
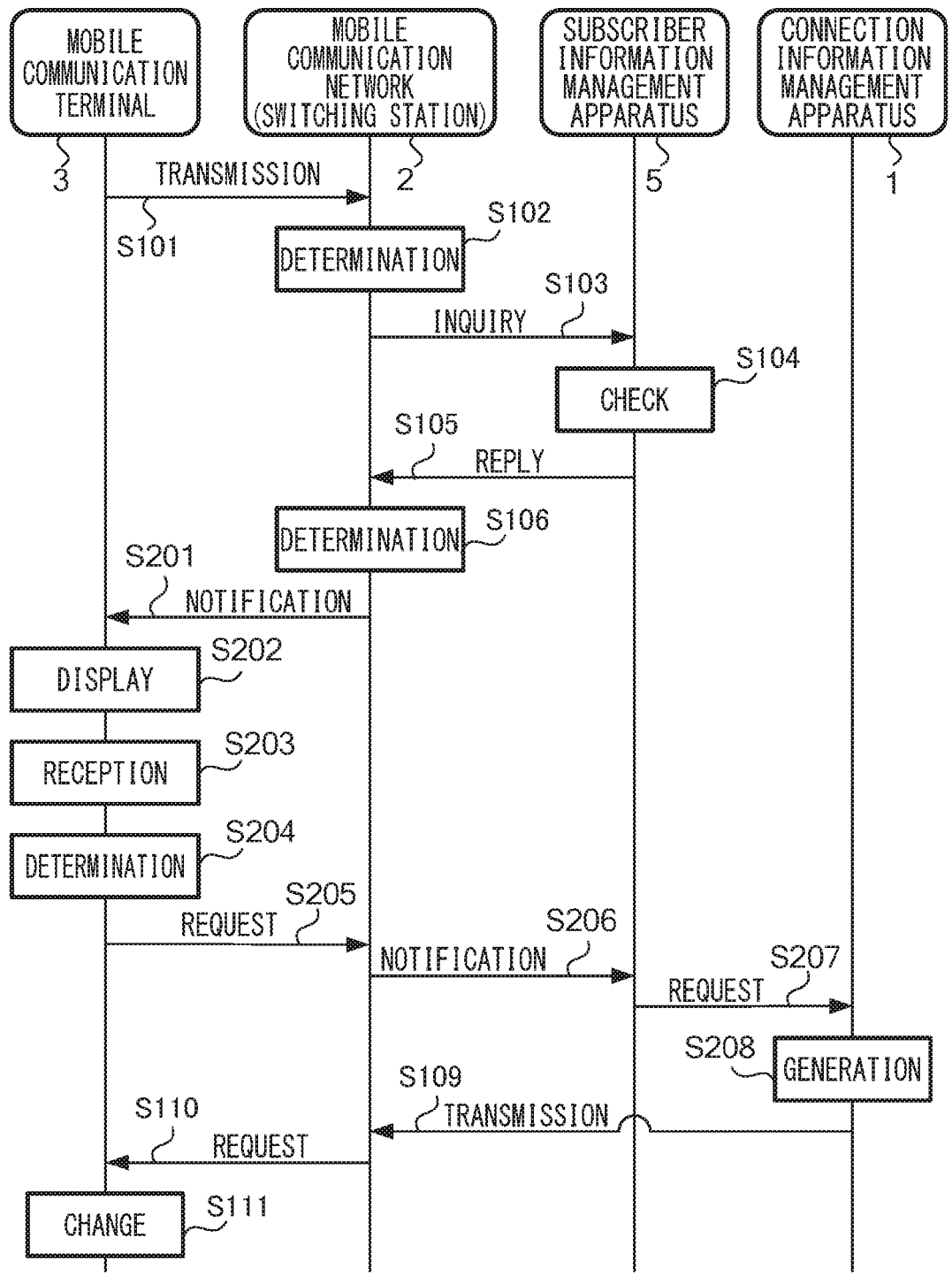
FIG. 11 is a sequence diagram showing a flow of operations in a communication system according to a variation.

FIG. 11 is a sequence diagram showing a flow of operations in communication system 9 according to this variation. Steps with the same reference numbers as in FIG. 9 are the same as the steps described in the embodiment, and therefore will not be described. If it is determined in step S106 that mobile communication terminal 3 can change its profile, switching station 22 sends a notification to that effect to mobile communication terminal 3 (step S201). Upon receiving the notification, mobile communication terminal 3 displays a message indicating that the profile can be changed on display unit 35 (step S202), and receives a user operation performed on operation unit 34 (step S203).

If the user operation received by operation unit 34 instructs a profile change, control unit 31 of mobile communication terminal 3 searches profile storage region 321 of storage unit 32 and determines whether the profile to be changed to is stored in storage unit 32 (step S204).

If the profile to be changed to is not stored in storage unit 32, control unit 31 requests the profile from switching station 22 (step S205). Upon receiving this request, switching station 22 notifies subscriber information management apparatus 5 (step S206), and subscriber information management apparatus 5 extracts the profile indicated by the notified request from profile database 521. Subscriber information management apparatus 5 then transmits the extracted profile to connection information management apparatus 1 and requests the push transmission of the profile to mobile communication terminal 3 (step S207). Upon receiving the request, connection information management apparatus 1 generates an instruction indicating that mobile communication terminal 3 is to change the profile currently being used to the profile transmitted by subscriber information management apparatus 5 (step S208). Connection information management apparatus 1 then transmits the generated instruction to mobile communication terminal 3 via mobile communication network 2 (steps S109 and S110), thus requesting mobile communication terminal 3 to make a profile change.

According to this configuration, a profile change is made in accordance with a user operation, thus making it possible to stop a profile change not desired by the user.

2-4. Variation 4

In the above description, the present invention is conceived as a switching station 22 invention, but the present invention can also be conceived as a method of controlling switching station 22.

2-5. Variation 5

A program executed by control unit 221 of switching station 22 can be provided in the state of being stored on a computer-readable recording medium such as a magnetic recording medium such as a magnetic tape or a magnetic disk, an optical recording medium such as an optical disk, an optical magnetic recording medium, or a semiconductor memory. Also, this program can be downloaded via a network such as the Internet. Note that there are cases where various apparatuses other than a CPU are applied as the controller illustrated by control unit 221, and a dedicated processor or the like is used in such cases, for example.

2-6. Variation 6

Although mobile communication terminal 3 is a mobile phone such as a smartphone in the above-described embodiment, this need not be the case. For example, mobile communication terminal 3 may be a tablet terminal, a slate PC (Personal Computer), a PDA (Personal Digital Assistant), a mobile music playback device, a mobile video playback device, a gaming device, an electronic book viewing apparatus, a navigation apparatus, or the like.

REFERENCE SIGNS LIST

1(1a,1b) Connection information management apparatus
2(2a,2b) Mobile communication network
22 Location information management apparatus
22 Switching station (control apparatus)
221 Control unit
2211 Inquiry unit
2212 Determination unit
2213 Notification unit
222 Storage unit
223 Communication unit
23 Base station
3 Mobile communication terminal
31 Control unit
32 Storage unit
321 Profile storage region
33 Communication unit
34 Operation unit
35 Display unit
4 Communication line
5 Subscriber information management apparatus (management apparatus)
51 Control unit
52 Storage unit
521 Profile database
5211 Association table
5212 Profile table
22 App database
5221 User ID list
5222 App table
53 Communication unit
9 Communication system

What is claimed is:

1. A control apparatus comprising:
   a memory;
   a processor; and
   a transceiver,
   the processor configured to:
   execute a program stored in the memory;
   determine whether identification information for identifying a mobile communication terminal in a second mobile communication network can be changed from a first identification information assigned in the first mobile communication network to a second identification information assigned in the second mobile communication network, when the mobile communication terminal in which the first identification information is stored is situated in a region in which the second mobile communication network can be used; and
   transmit via the transceiver a notification of a change of the identification information to a request apparatus that is connected to the second mobile communication network and is configured to request the mobile communication terminal to change the identification information, if it is determined that the identification information can be changed.

2. The control apparatus according to claim 1, wherein the processor is further configured to:
   transmit via the transceiver to a management apparatus an inquiry as to whether the identification information can be changed; and
   determine, based on a result of the inquiry, whether the identification information can be changed.

3. The control apparatus according to claim 2, wherein the processor is further configured to:
   specify an application program used by the mobile communication terminal based on communication performed with the mobile communication terminal,
   wherein the management apparatus manages information indicating whether the identification information can be changed in association with application programs, and
   the processor transmits an inquiry regarding the information associated with the specified application program to the management apparatus.

4. The control apparatus according to claim 1, wherein the mobile communication terminal changes the identification information from the first identification information to the second identification information upon receipt of a request for changing the identification information.

5. A communication system comprising:
   a control apparatus that controls a mobile communication terminal that uses a mobile communication network with use of identification information assigned in the mobile communication network; and
   a request apparatus connected to the mobile communication network, that requests the mobile communication terminal to change the identification information upon receipt of a notification of a change of the identification information by the control apparatus,
wherein the control apparatus comprises:
a memory;
a processor; and
a transceiver,
the processor configured to:
execute a program stored in the memory;
determine whether identification information for identifying a mobile communication terminal in a second mobile communication network can be changed from a first identification information assigned in the first mobile communication network to a second identification information assigned in the second mobile communication network, when the mobile communication terminal in which the first identification information is stored is situated in a region in which the second mobile communication network can be used; and
transmit via the transceiver a notification of a change of the identification information to a request apparatus that is connected to the second mobile communication network and is configured to request the mobile communication terminal to change the identification information, if it is determined that the identification information can be changed.

6. The communication system according to claim 5, further comprising:
a management apparatus that replies that the identification information can be changed from the first identification information to the second identification information if a time when an inquiry regarding whether the identification information can be changed is received from the control apparatus, a location of the mobile communication terminal at that time, or a change in price or functionality in a case where the mobile communication terminal changes the identification information from the first identification information to the second identification information satisfies a predetermined condition, wherein the processor is further configured to determine whether the identification information can be changed based on a reply received from the management apparatus.

7. A control method comprising:
determining whether identification information for identifying a mobile communication terminal in a second mobile communication network can be changed from first identification information assigned in the first mobile communication network to a second identification information assigned in the second mobile communication network, when the mobile communication terminal in which the first identification information is stored is situated in a region in which the second mobile communication network can be used; and
transmitting a notification of a change of the identification information to a request apparatus that is connected to the second mobile communication network and is configured to request the mobile communication terminal to change the identification information, if it is determined that the identification information can be changed.

8. A program stored on a non-transitory computer readable medium, the program causing a computer to execute:
determining whether identification information for identifying a mobile communication terminal in a second mobile communication network can be changed from first identification information assigned in the first mobile communication network to a second identification information assigned in the second mobile communication network, when the mobile communication terminal in which the first identification information is stored is situated in a region in which the second mobile communication network can be used; and
transmitting a notification of a change of the identification information to a request apparatus that is connected to the second mobile communication network and is configured to request the mobile communication terminal to change the identification information, if it is determined that the identification information can be changed.

* * * * *